US011604674B2

(12) United States Patent
Landau et al.

(10) Patent No.: US 11,604,674 B2
(45) Date of Patent: Mar. 14, 2023

(54) SYSTEMS AND METHODS FOR DETECTING AND FILTERING FUNCTION CALLS WITHIN PROCESSES FOR MALWARE BEHAVIOR

(71) Applicant: Elasticsearch B.V., Mountain View, CA (US)

(72) Inventors: Gabriel D. Landau, Glen Burnie, MD (US); Joseph W. Desimone, Hanover, MD (US)

(73) Assignee: Elasticsearch B.V., Amsterdam (NL)

( * ) Notice: Subject to any disclaimer, the term of this patent is extended or adjusted under 35 U.S.C. 154(b) by 286 days.

(21) Appl. No.: 17/012,879

(22) Filed: Sep. 4, 2020

(65) Prior Publication Data

US 2022/0075646 A1 Mar. 10, 2022

(51) Int. Cl.
*G06F 9/46* (2006.01)
*G06F 9/48* (2006.01)
(Continued)

(52) U.S. Cl.
CPC .......... *G06F 9/4843* (2013.01); *G06F 9/5016* (2013.01); *G06F 9/547* (2013.01);
(Continued)

(58) Field of Classification Search
CPC ...... G06F 9/4843; G06F 9/5016; G06F 9/547; G06F 11/3051; G06F 21/56; G06F 2209/5011; G06F 2209/5018
(Continued)

(56) References Cited

U.S. PATENT DOCUMENTS

| | | | |
|---|---|---|---|
| 6,519,597 | B1 | 2/2003 | Cheng et al. |
| 7,945,533 | B2 | 5/2011 | Krishnaprasad et al. |

(Continued)

FOREIGN PATENT DOCUMENTS

| | | | |
|---|---|---|---|
| CN | 106528797 | A | 3/2017 |
| CN | 106934062 | A | 7/2017 |
| WO | WO2020131330 | A1 | 6/2020 |

OTHER PUBLICATIONS

Bradford, Ronald, "SQL, ANSI Standards, PostgreSQL and MySQL", Retrieved from the Internet: <URL http://ronaldbradford.com/blog/sql-ansi-standards-postgresql-and-mysql-2015-03-26/, Mar. 26, 2015 [retrieved on Jun. 4, 2021], 33 pages.

(Continued)

*Primary Examiner* — Bradley A Teets
(74) *Attorney, Agent, or Firm* — Quinn IP Law

(57) ABSTRACT

Systems and methods for monitoring a process a provided. An example method commences with providing a management platform. The management platform is configured to receive user rules for processing at least one function call within the process. A high-level script can be used based on the user rules to develop and install at least one library to execute synchronously within the process. The at least one library can be configured to monitor the process for at least one function call and capture argument values of the function call before the argument values are passed to a function. The at least one library can filter the function call based at least in part on the argument values. The method can continue with selectively creating an API event for execution by a dedicated worker thread. The execution of the API event is performed asynchronously with regard to the process.

20 Claims, 5 Drawing Sheets

(51) Int. Cl.

| | |
|---|---|
| ***G06F 9/54*** | (2006.01) |
| ***G06F 9/50*** | (2006.01) |
| ***G06F 21/56*** | (2013.01) |
| ***G06F 11/30*** | (2006.01) |

(52) U.S. Cl.
CPC .......... *G06F 11/3051* (2013.01); *G06F 21/56* (2013.01); *G06F 2209/5011* (2013.01); *G06F 2209/5018* (2013.01)

(58) Field of Classification Search
USPC .......................................................... 718/102
See application file for complete search history.

(56) References Cited

U.S. PATENT DOCUMENTS

| | | | |
|---|---|---|---|
| 8,352,519 | B2 | 1/2013 | Nath |
| 8,615,794 | B1 | 12/2013 | Tomilson et al. |
| 8,898,261 | B1 | 11/2014 | Patsenker et al. |
| 8,930,332 | B2 | 1/2015 | Burstein |
| 8,938,807 | B1 * | 1/2015 | Huang .................... G06F 21/56 726/23 |
| 9,015,301 | B2 | 4/2015 | Redlich et al. |
| 9,734,180 | B1 | 8/2017 | Graham et al. |
| 10,541,983 | B1 | 1/2020 | Khashei Varnamkhasti et al. |
| 10,891,165 | B2 | 1/2021 | Willnauer |
| 10,997,204 | B2 | 5/2021 | Leskes |
| 11,182,093 | B2 | 11/2021 | Leskes |
| 11,188,531 | B2 | 11/2021 | Lean |
| 2005/0004892 | A1 | 1/2005 | Brundage et al. |
| 2005/0114397 | A1 | 5/2005 | Doshi et al. |
| 2006/0075079 | A1 | 4/2006 | Powers et al. |
| 2009/0276215 | A1 | 11/2009 | Hager |
| 2010/0174677 | A1 | 7/2010 | Zahavi |
| 2011/0047620 | A1 * | 2/2011 | Mahaffey .............. G06F 21/564 726/22 |
| 2011/0134764 | A1 | 6/2011 | Venkatapadmanaabhan |
| 2011/0282839 | A1 | 11/2011 | Paksoy et al. |
| 2012/0233118 | A1 | 9/2012 | Holt et al. |
| 2012/0233299 | A1 | 9/2012 | Attanasio et al. |
| 2013/0086039 | A1 | 4/2013 | Salch et al. |
| 2013/0297469 | A1 | 11/2013 | Spittle et al. |
| 2014/0012814 | A1 | 1/2014 | Bercovici et al. |
| 2014/0157224 | A1 | 6/2014 | Capuozzo et al. |
| 2014/0279871 | A1 | 9/2014 | Ochoa et al. |
| 2014/0330785 | A1 | 11/2014 | Isherwood et al. |
| 2015/0280999 | A1 | 10/2015 | Chart et al. |
| 2015/0293955 | A1 | 10/2015 | Dickey |
| 2015/0379083 | A1 | 12/2015 | Lang et al. |
| 2016/0085839 | A1 | 3/2016 | D'Halluin et al. |
| 2016/0127517 | A1 | 5/2016 | Shcherbakov |
| 2016/0191509 | A1 | 6/2016 | Bestler et al. |
| 2016/0203168 | A1 | 7/2016 | Gangadharappa |
| 2016/0203174 | A1 | 7/2016 | Shahane et al. |
| 2016/0224600 | A1 | 8/2016 | Munk |
| 2016/0292171 | A1 | 10/2016 | Bhagat et al. |
| 2017/0024453 | A1 | 1/2017 | Raja et al. |
| 2017/0078167 | A1 | 3/2017 | Bansal |
| 2017/0124151 | A1 | 5/2017 | Ji et al. |
| 2017/0193041 | A1 | 7/2017 | Fuchs |
| 2017/0371926 | A1 | 12/2017 | Shiran et al. |
| 2018/0032733 | A1 * | 2/2018 | Surdu .................. G06F 9/4418 |
| 2018/0189328 | A1 | 7/2018 | Frazier et al. |
| 2018/0268000 | A1 | 9/2018 | McManus et al. |
| 2019/0026336 | A1 | 1/2019 | Tian |
| 2019/0124105 | A1 | 4/2019 | Chauhan |
| 2019/0266271 | A1 | 8/2019 | Leau |
| 2020/0050612 | A1 | 2/2020 | Bhattacharjee et al. |
| 2020/0084213 | A1 | 3/2020 | Taropa |
| 2020/0133550 | A1 | 4/2020 | Willnauer |
| 2020/0176098 | A1 | 6/2020 | Lucas et al. |
| 2020/0201879 | A1 | 6/2020 | Leskes |
| 2020/0233692 | A1 | 7/2020 | Kandula |
| 2020/0326986 | A1 | 10/2020 | Willnauer |
| 2020/0328936 | A1 | 10/2020 | Herce et al. |
| 2020/0348878 | A1 | 11/2020 | Leskes |
| 2021/0124620 | A1 | 4/2021 | Willnauer |
| 2021/0126977 | A1 | 4/2021 | Ruflin et al. |
| 2021/0015263 | A1 | 5/2021 | Ruflin et al. |
| 2021/0240731 | A1 | 8/2021 | Leskes |
| 2022/0035555 | A1 | 2/2022 | Leskes |
| 2022/0050844 | A1 | 2/2022 | Leau |

OTHER PUBLICATIONS

"Can i use elasticsearch-sql to convert sql to DSL?", GitHub, Retrieved from the Internet: <URL https://github.com/NLPchina/elasticsearch-sql/issues/156>, Feb. 2016 [retrieved on Jul. 29, 2020], 4 pages.

Andhavarapu, Abhishek, "Beginners guide to querying Elasticsearch (Scoring vs Sorting)", Retrieved from the Internet: <URL https://abhishek376.wordpress.com/2017/07/06/begginers-guide-to-querying-elasticsearch/, Jul. 6, 2017 [retrieved on Jun. 4, 2021], 10 pages.

"Extended European Search Report", European Patent Application No. 21165715.0, dated Dec. 10, 2020, 7 pages.

"Office Action", British Patent Application No. GB 2104443.3, dated Aug. 16, 2021, 9 pages.

"Office Action", British Patent Application No. GB2105205.5, dated Oct. 4, 2021, 11 pages.

"Extended European Search Report", European Patent Application No. 21167941.0, dated Sep. 6, 2021, 10 pages.

"International Search Report" and "Written Opinion of the International Searching Authority," Patent Cooperation Treaty Application No. PCT/US2019/063437, dated Feb. 7, 2020, 8 pages.

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.

Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.

* cited by examiner

SYSTEMS AND METHODS FOR DETECTING AND FILTERING FUNCTION CALLS WITHIN PROCESSES FOR MALWARE BEHAVIOR

TECHNICAL FIELD

The present disclosure relates generally to data processing and, more particularly, to systems and methods for monitoring processes.

BACKGROUND

Currently, enterprises employ multiple techniques to secure their systems, some of which involve monitoring, changing, or augmenting behavior of an operating system, applications, or software components. The existing techniques includes intercepting function calls, events, and messages communicated between software components in order to perform specific processing of the function calls, events, and messages before they reach their intended software components. Such interception technique can be used in a debugging process; to review, detect, or deactivate malicious agents; for optimizing system performance; and so forth. However, to implement an interception technique, a software developer needs to write custom code for the function calls, events, or messages to be intercepted. This approach is time and resource consuming, and requires specialized skills. Existing systems for intercepting function calls, events, and messages lack configurability and cannot be adapted to specific needs of a customer.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for monitoring a process. According to one example embodiment, a system for monitoring a process includes a processor and a memory communicatively coupled to the processor. The processor may be configured to provide a management platform. The management platform may be configured to receive user rules for processing at least one function call within the process. The processor may be configured to use, based on the user rules, a high-level script to develop and install at least one library in order to execute synchronously within the process. The at least one library may be configured to monitor the process for the at least one function call and, in response to detecting the at least one function call, capture argument values of the function call before the argument values are passed to a function. The at least one library may be further configured to filter the at least one function call based at least in part on the argument values. Based on the filtering, the at least one library may selectively create an Application Programming Interface (API) event for execution by a dedicated worker thread. The execution of the API event may be performed asynchronously with regard to the process.

According to another example embodiment, a method for monitoring a process is provided. The method may commence with providing a management platform. The management platform may be configured to receive user rules for processing at least one function call within the process. A high-level script may be used based on the user rules to develop and install at least one library to execute synchronously within the process. The at least one library may be configured to monitor the process for the at least one function call. Argument values of the function call can be captured before the argument values are passed to a function. The capture of the argument values may be performed in response to detecting the at least one function call. The function call can be filtered based at least in part on the argument values. The method may then continue with selectively creating an API event for execution by a dedicated worker thread. The API event may be created based on the filtering. The execution of the API event may be performed asynchronously with regard to the process.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for monitoring a process for malware behavior. The malware behavioral monitoring system disclosed herein can be integrated into a security system of a customer to monitor use of arbitrary APIs enterprise-wide. The customer may select and/or configure user rules depending on function calls, events, or messages that need to be intercepted and processed. The malware behavioral monitoring system can use a high-level script to implement user rules for selecting functions and enabling interception of the functions by capturing argument values of functions before the functions are executed. Values and metadata associated with a function call (also referred to an API call) can be sent to the malware behavioral monitoring system for further processing.

In an example embodiment, at a process launch, a library may be injected into the monitored process. The library may be configured to monitor the process and execute a script to inspect the customer environment and decide on an intercepting function to install. The library may be configured to rapidly develop and install intercepting functions based on the specific needs of the customer. The intercepting function may handle interception of a specific function call, event, or message. For each API event, the high-level script can specify a library name, function name, number of arguments, and types of the arguments to be intercepted.

An API event is created in response to each captured API call and fed to a dedicated worker thread for execution. The execution of the API event can be performed asynchronously with regard to the monitored process to avoid overloading of the memory. The dedicated worker thread may invoke a user-specific high-level script function defined by the user rules. An example user-specified high-level script function may include a mitigation action to prevent or terminate malware behavior. The API events can be stored in an event log and processed by a rules engine.

Figure 1:
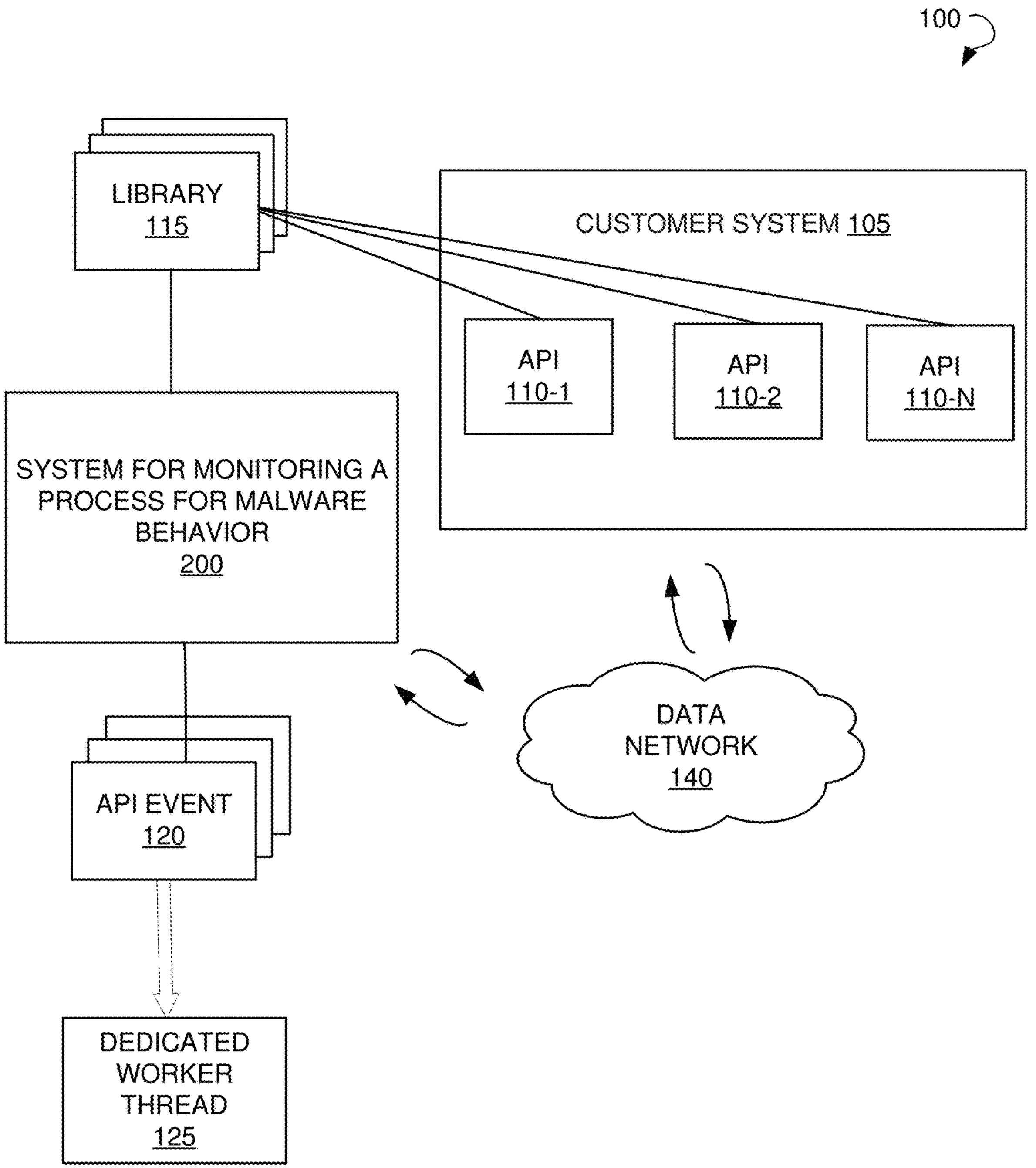
FIG. 1 is a block diagram of an environment, in which systems and methods for monitoring a process can be implemented, according to some example embodiments.

Referring now to the drawings, FIG. 1 is a block diagram of environment 100, in which systems and methods for monitoring a process can be implemented, according to some example embodiments. The environment 100 can include a customer system 105 and a system 200 for monitoring a process (referred herein to as a system 200). The customer system 105 can include a computing system associated with a customer (not shown) or an enterprise (not shown). The customer system 105 can have a plurality of APIs shown as APIs 110-1, 110-2, and 110-N, which can be running on the customer system 105. The system 200 may be connected to the customer system 105 to monitor the customer system 105 for malware behavior. Specifically, the system 200 may invoke one or more libraries 115 to execute synchronously within a process associated with one of APIs 110-1, 110-2, and 110-N. The library 115 may detect a function call associated with one of APIs 110-1, 110-2, and 110-N, capture an argument value associated with the function call, and create an API event 120 based on the captured argument value. The library 115 may provide the API event 120 to a dedicated worker thread 125 for execution.

In an example embodiment, the system 200 may communicate with the customer system 105 via a data network 140. The data network 140 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 140 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Figure 2:
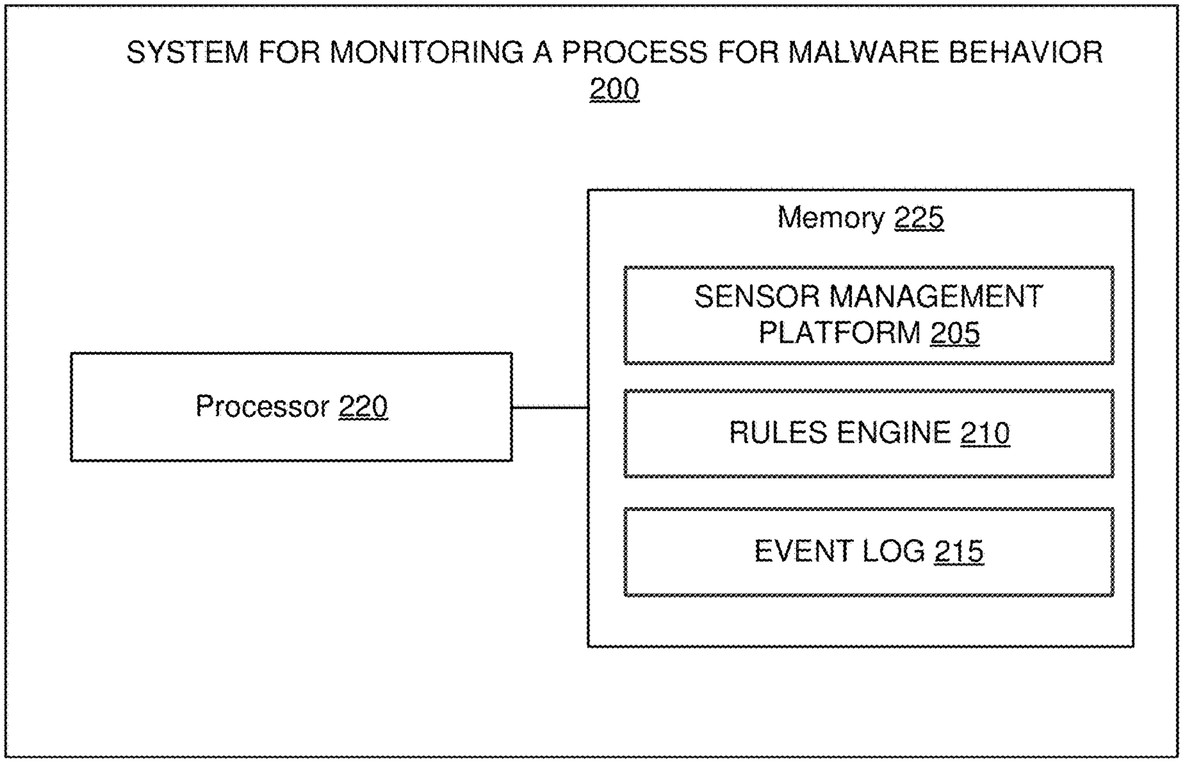
FIG. 2 shows a system for monitoring a process, according to an example embodiment.

FIG. 2 shows a system 200 for monitoring a process for malware behavior, according to an example embodiment. The system 200 may include a processor 220 and a memory 225 communicatively coupled to the processor 220. The memory 225 may store instructions executable by the processor 220. In an example embodiment, the instructions can be performed by a sensor management platform 205, a rules engine 210, and an event log 215. The system 200 enables a user to create a library can be injected into a software system to be monitored and alter processes in the system in such a way as to provide a visibility into low-level processes performed by the system. Thus, the system 200 can be configured to provide monitoring of the behavior of processes that are potentially malicious. The operations performed by the sensor management platform 205, rules engine 210, and event log 215 are described in more detail below with reference to FIG. 3.

Figure 3:
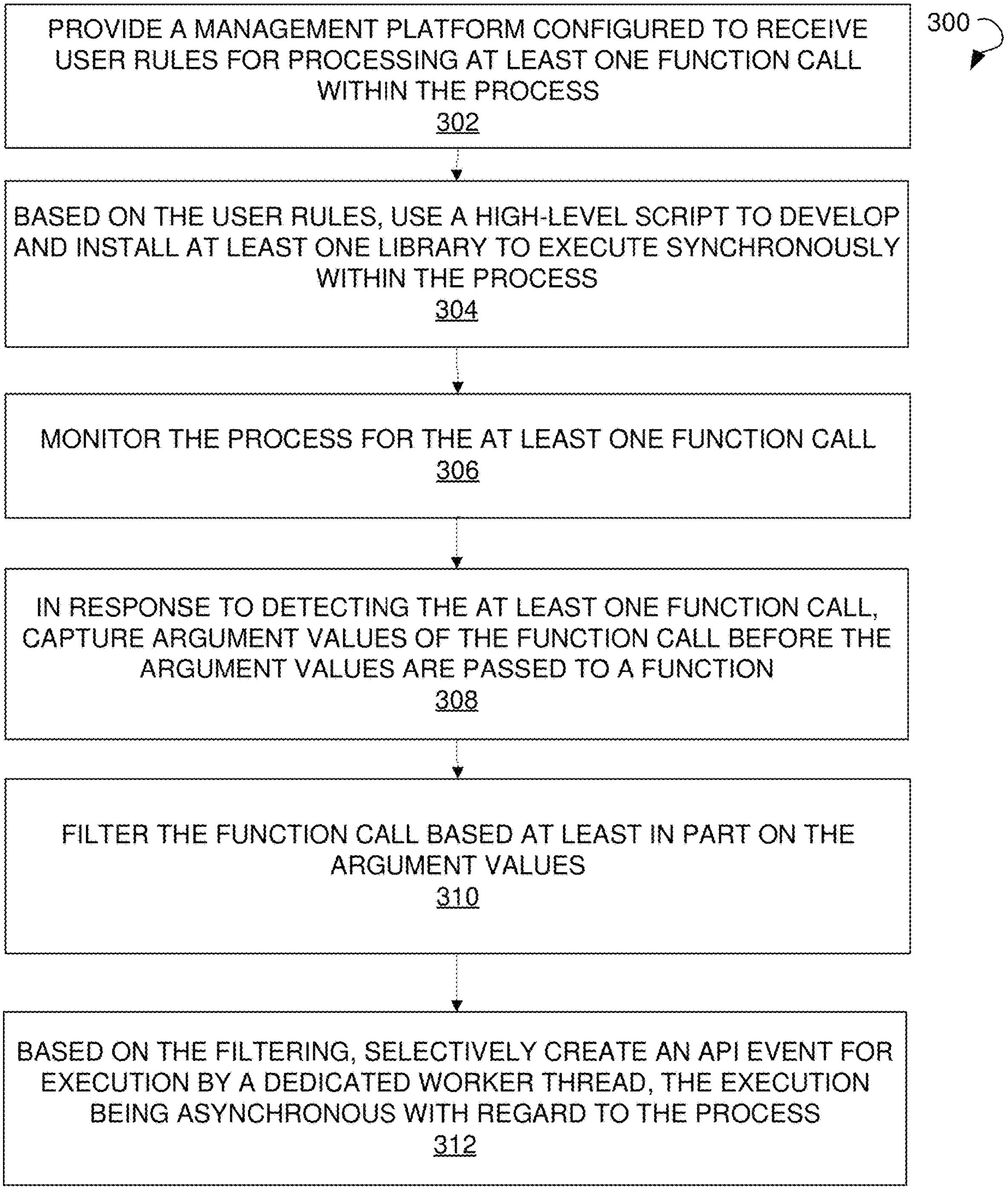
FIG. 3 is a flow chart of example method for monitoring a process, according to some example embodiments.

FIG. 3 is a flow chart of an example method 300 for monitoring a process, according to some example embodiments. The method 300 may commence with providing a management platform (also referred herein to as a sensor management platform 205) at operation 302. The management platform can be configured to receive user rules for processing at least one function call within the process. The user rules can be provided by a user. The user may select the user rules from a predetermined set of user rules as well as create their own. The user can configure user rules by selecting specific parameters. The management platform can enable the user to configure the user rules with a toggle or via a rule builder. The user rules can include at least one of the following: argument values of the function call, return values of the function call, function call metadata, function name, number of arguments in the function call, type of arguments, process handle, thread handle, token handle, level of protective action, and so forth.

At operation 304, a high-level script can be used to develop and install at least one library to execute synchronously within the process based on the user rules. The high-level script may be written in a high-speed interpreted language. An example high-speed interpreted language may include a lightweight embeddable scripting language, such as Lua programming language.

The at least one library may be configured to create and/or modify a code to perform specific steps and receive specific events. Specifically, the at least one library can be configured to monitor the process for the least one function call at operation 306. At operation 308, the at least one library may capture argument values of the function call before the argument values are passed to a function associated with the function call. The capture of the argument values can be performed in response to detecting the function call. In an example embodiment, the library may include Microsoft Detours library.

In an example embodiment, the at least one library may be further configured to capture one more of the following parameters synchronously: Security Identifier (SID), integrity level, Locally Unique Identifier (LUID), impersonation level, token, token type, window handle, file handle, file name, file path, registry key, key name, key path, and call stack for the API event.

At operation 310, the at least one library may filter the at least one function call based at least in part on the argument values. In an example embodiments, the filtering may include analyzing the argument values associated with the function call and determining whether the function call satisfies the user criteria. For example, the process to be monitored may include determining whether it is possible to write to the file. If it is determined, based on the argument values, that the file is a read-only file, the function call can be dropped. No records associated with the dropped function call need to be stored. Therefore, the amount of data collected in the form of API events can be reduced by filtering out non-relevant function calls.

The method 300 may continue with selectively creating, at operation 312, an API event for execution by a dedicated worker thread. The API event may be created based on the filtering. Specifically, the API event may be created only for a function call that was not dropped as a result of the filtering. The execution of the API event may be performed asynchronously with regard to the process. The dedicated worker thread may invoke a user-specified high-level script function defined by the user rules. The user-specified high-level script function can be configured to perform automated mitigation actions associated with detected malware behavior.

In example embodiments, the user-specified high-level script function may be configured to perform one or more of the following actions: automatically update a customer without requiring a reboot or a user intervention, ignore the API event, store information concerning the API event, discard the API event, terminate the process, create a silent alert to provide telemetry associated the API event, take a protective action, report an occurrence of the API event, an automated mitigation action, limiting an amount of synchronous processing, and so forth. The limiting of an amount of synchronous processing may include one or more of the following: reducing a number of dropped events, limiting a rate, setting memory quotas, implementing constraints, and so forth. The rate limiting may be implemented using a token bucket algorithm by setting maximums on number of API events to be captured and processed. The memory quotas may include allocating memory up to a fixed amount of a memory pool.

In an example embodiment, the user-specified high-level script function that performs the termination of the process may be performed as follows. The user rules may include terminating a process named “AAA.” Upon detecting the process named “AAA,” the user-specified high-level script function may terminate the process named “AAA” asynchronously. Specifically, the process named “AAA” may not be stopped from occurring, but rather terminated a couple milliseconds after the has performed an action.

A plurality of API events created by the system 200 can be analyzed to provide behavior monitoring. The API events can be assigned a confidence level. A high confidence level can be assigned to API events for which alerts need to be created and provided to the user. In response to an alert, a protective action can be taken. In an example embodiment, the protective action can be taken by the system 200 or by the user. A low/high confidence level can be assigned to API events for which no alerts need to be created at the time, but which should be stored for further analysis.

In some example embodiment, a silent alert may be generated by the system 200. The silent alert can send telemetry data to the system 200. Based on the telemetry data, new threats can be determined. The telemetry data can be used to create libraries configured to capture function calls associated with new threats.

In an example embodiment, a user may want to monitor a function that creates a file. The user may specify rules by providing a name of the function and type information. In this embodiment, a high-level script may determine which API needs to be accessed and invoke a library to be executed synchronously within the process. The library can be injected into the process to monitor the process upon launching a function call that creates a file. In an example embodiment, the monitoring may be performed by waiting for execution of a keylogger associated with the function.

In response to detecting the function call, the library can capture an argument value of the function call. The argument value can include a path of the file. The library may be run asynchronously, e.g., may capture the argument value not inline with the code responsible for opening the file, instead waiting for the function to open the file and capture the argument value after the file is opened.

Then, the system 200 may encapsulate the path of the file into a packet called an API event. Additionally, information concerning success/failure of the operation and other details concerning the opening of the file can be collected. The API event with encapsulated argument values can be put into a queue for processing by a dedicated worker thread asynchronously with regard to the process. Processing the API event asynchronously means avoiding overloading any security operations performed by the security system of the customer. The asynchronous execution includes, for example, rate limiting and memory quotas to limit the large amount of memory consumed. Therefore, the execution of the API event can be event-driven to reduce memory and central processing unit (CPU) load of the security system of the customer.

In an example embodiment, a code base can be preliminary created. The library can access the code base to create or prototype the code based on rules selected or configured by the user and/or based on a process monitored by the system 200. If a new threat is detected, an artifact update can be inserted into the code base such that the library can use the updated code to monitor the process associated with the new threat.

To optimize the system performance, the system 200 may forego collecting every single piece of data all the time. Instead, the system 200 may use a probabilistic method of threat detection, in which a predetermined amount of data is collected and analyzed, and a decision is made based on the analysis. The predetermined amount of data to be collected by the system 200 can be determined based on performance parameters of a customer system hosting the system 200.

Figure 4:
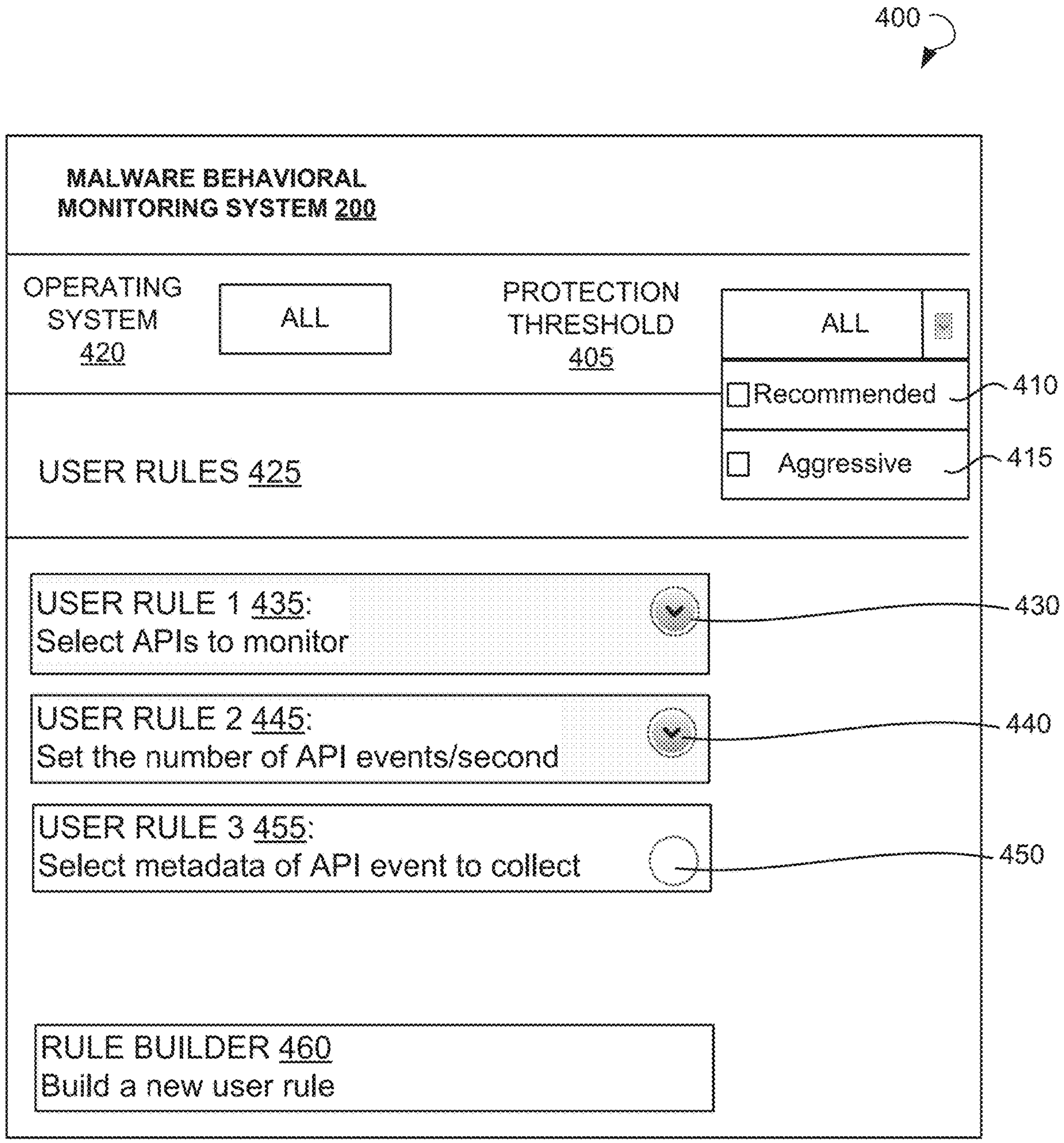
FIG. 4 is a user interface showing a system for monitoring a process, according to an example embodiment.

FIG. 4 represents a user interface 400 showing a system 200 for monitoring a process integrated into a security system of a customer, according to an example embodiment. The system 200 is a configurable system operable to satisfy various needs of customers. The configurability may be provided by enabling a user to configure user rules 425 for processing a function call within a process. Furthermore, the user may be able to create their own user rules using a rule builder 460. Based on the user rules selected or created by the user, a high-level script can develop and install a library to be executed synchronously within the process. Therefore, the library to be executed within the process can be created based on a particular set of user rules selected or created by the user.

As shown in FIG. 4, selecting the user rules may include selecting a protection threshold 405 by the user. The protection threshold 405 may include a recommended protection 410 such that the system 200 can monitor processes based on predetermined rules or a predetermined number of API events created within a limited time period. The recommended protection 410 may be used in order to avoid overwhelming the security system of the customer with the number of API events waiting in a queue to be processed by a worker thread. The protection threshold 405 may include an aggressive protection 415 such that the system 200 can closely monitor processes and generate a plurality of API events at a certain frequency in order to provide a granular view of a system behavior.

The user rules may include selecting an operating system 420 within which the processes are to be monitored by the system 200. The user interface 400 may also show a plurality of user rules 425 available for configuration by the user. The user may select a user rule by switching a toggle. For example, a user may use a toggle 430 to select a user rule 435 and configure the user rule 435 by selecting APIs to be monitored by the system 200. Furthermore, the user may use a toggle 440 to select a user rule 445 and configure the user rule 445 by setting the number of API events per second that can be collected by the system 200. Furthermore, the user may use a toggle 450 to select a user rule 455 and configure the user rule 455 by selecting metadata to be collected for the API event by the system 200. As shown in FIG. 4, the user rules 435 and 445 are enabled and the user rules 455 are disabled by the user.

In an example embodiment, the user may create his own rules using the rule builder 460. The user may use the rule builder 460 to provide specific parameters or write the user rules in a human-readable form. The user rules created by the user may be then by implemented in the system 200.

The system 200 enables monitoring low-level processes by using a high-level structure. Therefore, a user may avoid developing specific code responsible for interception functions and creating API events, instead focusing on researching threats that need to be prevented/addressed and selecting specific functions to be monitored/processed. Additionally, as the interception of the function and creation of API events is automatically performed at a high level by the system 200, no burden is put on software developers or quality assurance engineers, and turn-around time of configuring the system 200 to address new threats can be reduced.

Figure 5:
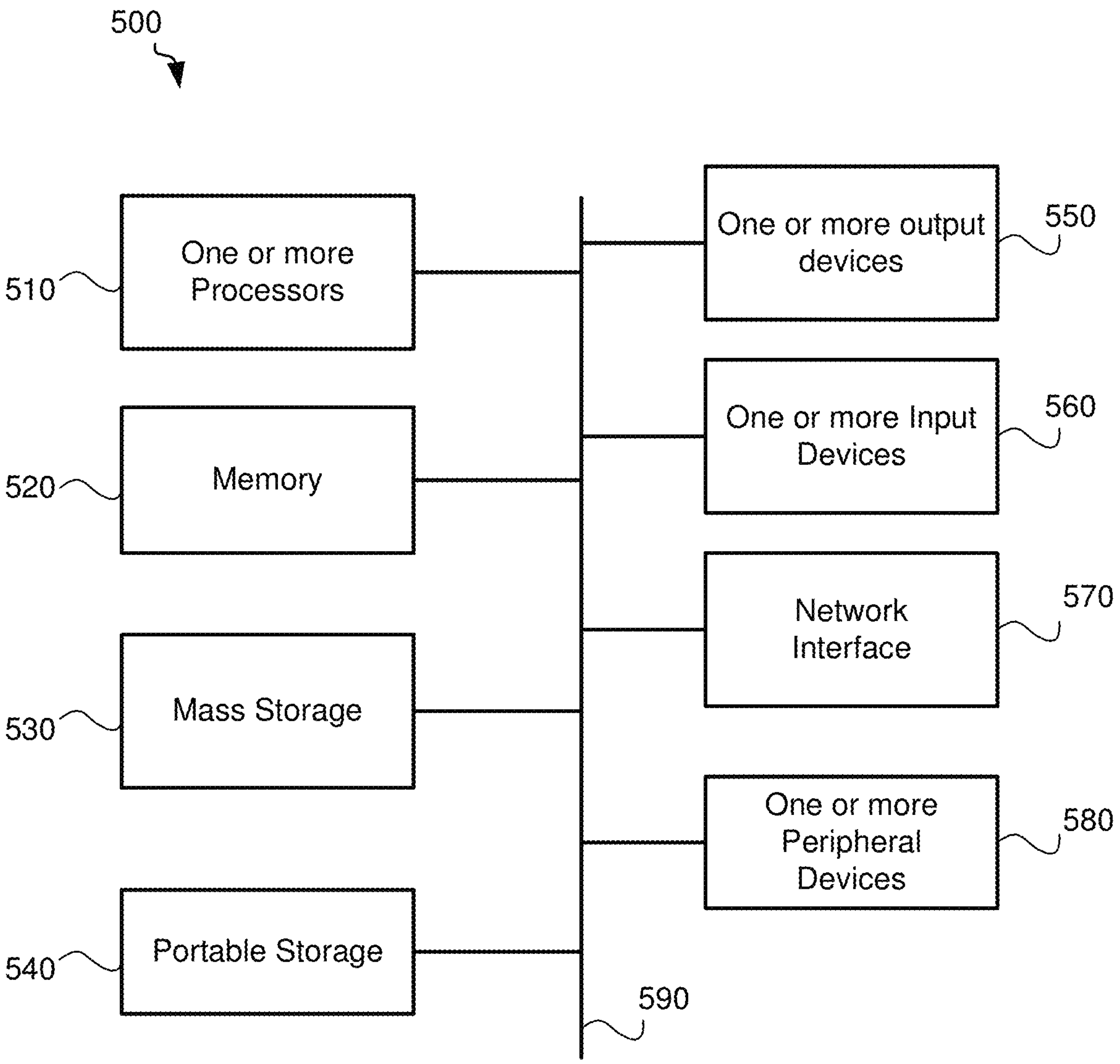
FIG. 5 shows a computing system that can be used to implement a system and a method for monitoring a process, according to an example embodiment.

FIG. 5 illustrates an exemplary computing system 500 that may be used to implement embodiments described herein. The computing system 500 can be implemented in the contexts of the system 200, the computing system 500, and the application controller. The exemplary computing system 500 of FIG. 5 may include one or more processors 510 and memory 520. Memory 520 may store, in part, instructions and data for execution by the one or more processors 510. Memory 520 can store the executable code when the exemplary computing system 500 is in operation. The exemplary computing system 500 of FIG. 5 may further include a mass storage 530, portable storage 540, one or more output devices 550, one or more input devices 560, a network interface 570, and one or more peripheral devices 580.

The components shown in FIG. 5 are depicted as being connected via a single bus 590. The components may be connected through one or more data transport means. The one or more processors 510 and memory 520 may be connected via a local microprocessor bus, and the mass storage 530, one or more peripheral devices 580, portable storage 540, and network interface 570 may be connected via one or more input/output buses.

Mass storage 530, which may be implemented with a magnetic disk drive or an optical disk drive, is a non-volatile storage device for storing data and instructions for use by a magnetic disk or an optical disk drive, which in turn may be used by one or more processors 510. Mass storage 530 can store the system software for implementing embodiments described herein for purposes of loading that software into memory 520.

Portable storage 540 may operate in conjunction with a portable non-volatile storage medium, such as a compact disk (CD) or digital video disc (DVD), to input and output data and code to and from the computing system 500 of FIG. 5. The system software for implementing embodiments described herein may be stored on such a portable medium and input to the computing system 500 via the portable storage 540.

One or more input devices 560 provide a portion of a user interface. The one or more input devices 560 may include an alphanumeric keypad, such as a keyboard, for inputting alphanumeric and other information, or a pointing device, such as a mouse, a trackball, a stylus, or cursor direction keys. Additionally, the computing system 500 as shown in FIG. 5 includes one or more output devices 550. Suitable one or more output devices 550 include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 580 may include any type of computer support device to add additional functionality to the computing system. The one or more peripheral devices 580 may include a modem or a router.

The components contained in the exemplary computing system 500 of FIG. 5 are those typically found in computing systems that may be suitable for use with embodiments described herein and are intended to represent a broad category of such computer components that are well known in the art. Thus, the exemplary computing system 500 of FIG. 5 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for monitoring a process are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method for monitoring a process, the method comprising:
- providing a management platform configured to receive user rules for processing at least one function call within the process; and
- based on the user rules, using a high-level script to develop and install at least one library to execute synchronously within the process, the at least one library being configured to:
- monitor the process for the at least one function call;
- in response to detecting the at least one function call, capture argument values of the function call before the argument values are passed to a function;
- filter the at least one function call based at least in part on the argument values; and
- based on the filtering, selectively create an Application Programming Interface (API) event for execution by a dedicated worker thread, the execution being asynchronous with regard to the process.

2. The method of claim 1, wherein the user rules include at least one of the following: the argument values, return values, function call metadata, a function name, a number of arguments, a type of arguments, a process handle, a thread handle, a token handle, and a level of protective action.

3. The method of claim 1, wherein the dedicated worker thread invokes a user-specified high-level script function defined by the user rules.

4. The method of claim 3, wherein the user-specified high-level script function is configured to perform one or more of the following actions: automatically update a customer without requiring a reboot or a user intervention, ignore the API event, store information concerning the API event, discard the API event, terminate the process, create a silent alert to provide telemetry associated with the API event, take a protective action, report an occurrence of the API event, an automated mitigation action, and limiting an amount of synchronous processing.

5. The method of claim 4, wherein the limiting an amount of synchronous processing includes one or more of the following: reducing a number of dropped events, limiting a rate, setting memory quotas, and implementing constraints.

6. The method of claim 5, wherein the rate limiting is implemented using a token bucket algorithm by setting maximums on number of API events to be captured and processed.

7. The method of claim 5, wherein the memory quotas include allocating memory up to a fixed amount of a memory pool.

8. The method of claim 1, wherein the at least one library is further configured to capture one more of the following parameters synchronously: a Security Identifier (SID), an integrity level, a Locally Unique Identifier (LUID), an impersonation level, a token, a token type, a window handle, a file handle, a file name, a file path, a registry key, a key name, a key path, and a call stack for the API event.

9. The method of claim 1, wherein the management platform is configured to enable a user to configure the user rules with a toggle or via a rule builder.

10. The method of claim 1, wherein the high-level script is a high-speed interpreted language.

11. A system for monitoring a process, the system comprising:
- a memory for storing executable instructions; and
- a processor coupled to the memory and configured to execute the executable instructions, the executable instructions including:
  - a management platform configured to receive user rules for processing at least one function call within the process; and
  - based on the user rules, use a high-level script to develop and install at least one library to execute synchronously within the process, the at least one library being configured to:
    - monitor the process for the at least one function call;
    - in response to detecting the at least one function call, capture argument values of the function call before the argument values are passed to a function;
    - filter the at least one function call based at least in part on the argument values; and
    - based on the filtering, selectively create an Application Programming Interface (API) event for execution by a dedicated worker thread, the execution being asynchronous with regard to the process.

12. The system of claim 11, wherein the user rules include at least one of the following: argument values, return values, function call metadata, a function name, a number of arguments, a type of arguments, a process handle, a thread handle, a token handle, and a level of protective action.

13. The system of claim 11, wherein the dedicated worker thread invokes a user-specified high-level script function defined by the user rules.

14. The system of claim 13, wherein the user-specified high-level script function is configured to perform one or more of the following actions: automatically update a customer without requiring a reboot or a user intervention, ignore the API event, store information concerning the API event, discard the API event, terminate the process, create a silent alert to provide telemetry associated with the API event, take a protective action, report an occurrence of the API event, an automated mitigation action, and limiting an amount of synchronous processing.

15. The system of claim 14, wherein the limiting an amount of synchronous processing includes one or more of the following: reducing a number of dropped events, limiting a rate, setting memory quotas, and implementing constraints.

16. The system of claim 15, wherein the rate limiting is implemented using a token bucket algorithm by setting maximums on a number of API events to be captured and processed.

17. The system of claim 15, wherein the memory quotas include allocating memory up to a fixed amount of a memory pool.

18. The system of claim 11, wherein the at least one library is further configured to capture one more of the following parameters synchronously: a Security Identifier (SID), an integrity level, a Locally Unique Identifier (LUID), an impersonation level, a token, a token type, a window handle, a file handle, a file name, a file path, a registry key, a key name, a key path, and a call stack for the API event.

19. The system of claim 11, wherein the management platform enables users to configure the user rules with a toggle or via a rule builder.

20. A system for monitoring a process, the system comprising:

a memory for storing executable instructions; and a processor coupled to the memory and configured to execute the executable instructions, the executable instructions including:

a management platform configured to:

receive user rules for processing at least one function call within the process; and enable users to configure the user rules with a toggle or via a rule builder; and based on the user rules, use a high-level script to develop and install at least one library to execute synchronously within the process, the at least one library being configured to:

monitor the process for the at least one function call;

in response to detecting the at least one function call, capture argument values of the function call before the argument values are passed to a function;

filter the at least one function call based at least in part on the argument values; and based on the filtering, selectively create an Application Programming Interface (API) event for execution by a dedicated worker thread, the execution being asynchronous with regard to the process, wherein the dedicated worker thread invokes a user-specified high-level script function defined by the user rules.

* * * * *